(12) United States Patent
Claringburn et al.

(10) Patent No.: US 6,324,315 B1
(45) Date of Patent: Nov. 27, 2001

(54) OPTICAL SWITCHING ARRANGEMENT

(75) Inventors: Harry R Claringburn; Martin G Baker, both of Nottingham (GB)

(73) Assignee: Marconi Communications Limited (GB)

( * ) Notice: Subject to any disclaimer, the term of this patent is extended or adjusted under 35 U.S.C. 154(b) by 0 days.

(21) Appl. No.: 09/391,761

(22) Filed: Sep. 8, 1999

(30) Foreign Application Priority Data

Mar. 12, 1999 (GB) .................................. 9905733

(51) Int. Cl.⁷ .................................................. G02B 6/26
(52) U.S. Cl. .................................. 385/16; 385/17; 385/14
(58) Field of Search .................................. 385/16, 17, 14, 385/8

(56) References Cited

U.S. PATENT DOCUMENTS

| | | | |
|---|---|---|---|
| 4,560,234 | * 12/1985 | Shaw et al. | 350/96.15 |
| 5,517,351 | * 5/1996 | Hatakeyama | 359/341 |
| 5,653,008 | * 8/1997 | Sim et al. | 29/600 |

FOREIGN PATENT DOCUMENTS

| | | |
|---|---|---|
| 2 251 096 A | 6/1992 | (GB) . |
| WO 96/33441 | 10/1996 | (WO) . |

\* cited by examiner

*Primary Examiner*—Georgia Epps
*Assistant Examiner*—Timothy J Thompson
(74) *Attorney, Agent, or Firm*—Kirschstein, et al.

(57) ABSTRACT

Optical switching arrangement for switching a number of optical signals, consists of a thermo-optic switch having a number of heaters which are heated by passing electrical current through them. The mark-space ratio of current supplied from a constant voltage source is varied to provide constant power to the heaters to compensate for resistance changes in the heaters.

14 Claims, 1 Drawing Sheet

OPTICAL SWITCHING ARRANGEMENT

BACKGROUND OF THE INVENTION

This invention relates to optical switching arrangements, and is particularly concerned with such arrangements which have temperature dependent switching elements. In order to achieve reliable switching, the temperature can be quite critical, but because such optical switching arrangements may include a large number of switching elements, there is a need for a simple but effective control mechanism which does not rely on measuring the operating temperature, and which does not require calibration of the individual switching elements.

SUMMARY OF THE INVENTION

According to this invention, an optical switching arrangement includes a thermo-optic switch having a plurality of heaters which are selectively energizable to route optical signals; means to apply a predetermined voltage to said heaters, and a power arrangement for applying pulsed current to energize said heaters, the mark-space ratio of the pulse current being variable to achieve a constant predetermined mean power value.

BRIEF DESCRIPTION OF THE DRAWINGS

The invention is further described by way of example with reference to the accompanying drawings, in which.

DETAILED DESCRIPTION OF THE PREFERRED EMBODIMENTS

Figure 1:
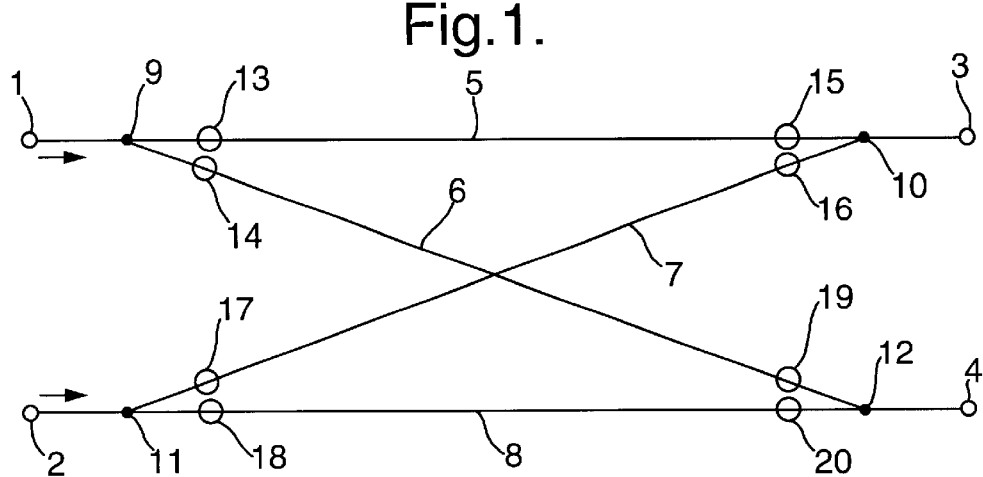
FIG. 1 shows an optical switch.

Referring to FIG. 1, there is shown therein a four port optical switch, having two input ports 1, 2, and two output ports 3, 4, the switch in a first configuration providing a straight through path from input port 1 to output port 3, and from input port 2 to output port 4. In a second configuration, the connections are from input port 1 to output port 4, and from input port 2 to output port 3.

The input and output ports are interconnected by means of light guides 5, 6, 7, 8, having junction points 9, 10, 11, 12 which constitute switching elements and which are controlled by localized heaters 13, 14, 15, 16, 17, 18, 19, 20. The light guides comprise planar waveguides having a temperature sensitive refractive index, and the routing function of the optical switch is determined by operating one or other of the pair of heaters associated with each junction point. For this reason, such an optical switch is termed a thermo-optic switch. An example of such a switch is the solid state optical switch sold by Akzo Nobel bv of the Netherlands.

Considering junction 9, light entering at port 1 is directed away from whichever junction arm has its heater energized, so that if heater 13 is energized, and heater 14 remains cool, the light is directed along light guide 6 to junction 12. Thus, to direct light from input port 1 to output port 4, and from input port 2 to output port 3, heaters, 13, 15, 18 and 20 are energized, with the other heaters 14, 16, 17, 19 being cool. Conversely, to allow light to pass straight through the optical switch, heaters 14, 16, 17, 19 are energised with the remaining heaters cool.

In practice, a number of optical switches of the kind shown in FIG. 1 will be combined in a single package having a large number of input and output ports.

It has been found that the power supplied to the heaters needs to be precisely set to allow for tolerances in the characteristics of individual junctions and heaters. In an optical switching arrangement having a large number of junctions, it is undesirable, and possibly impractical to adjust the power levels individually, particularly as the thermal and electrical properties can change as the product ages.

Figure 2:
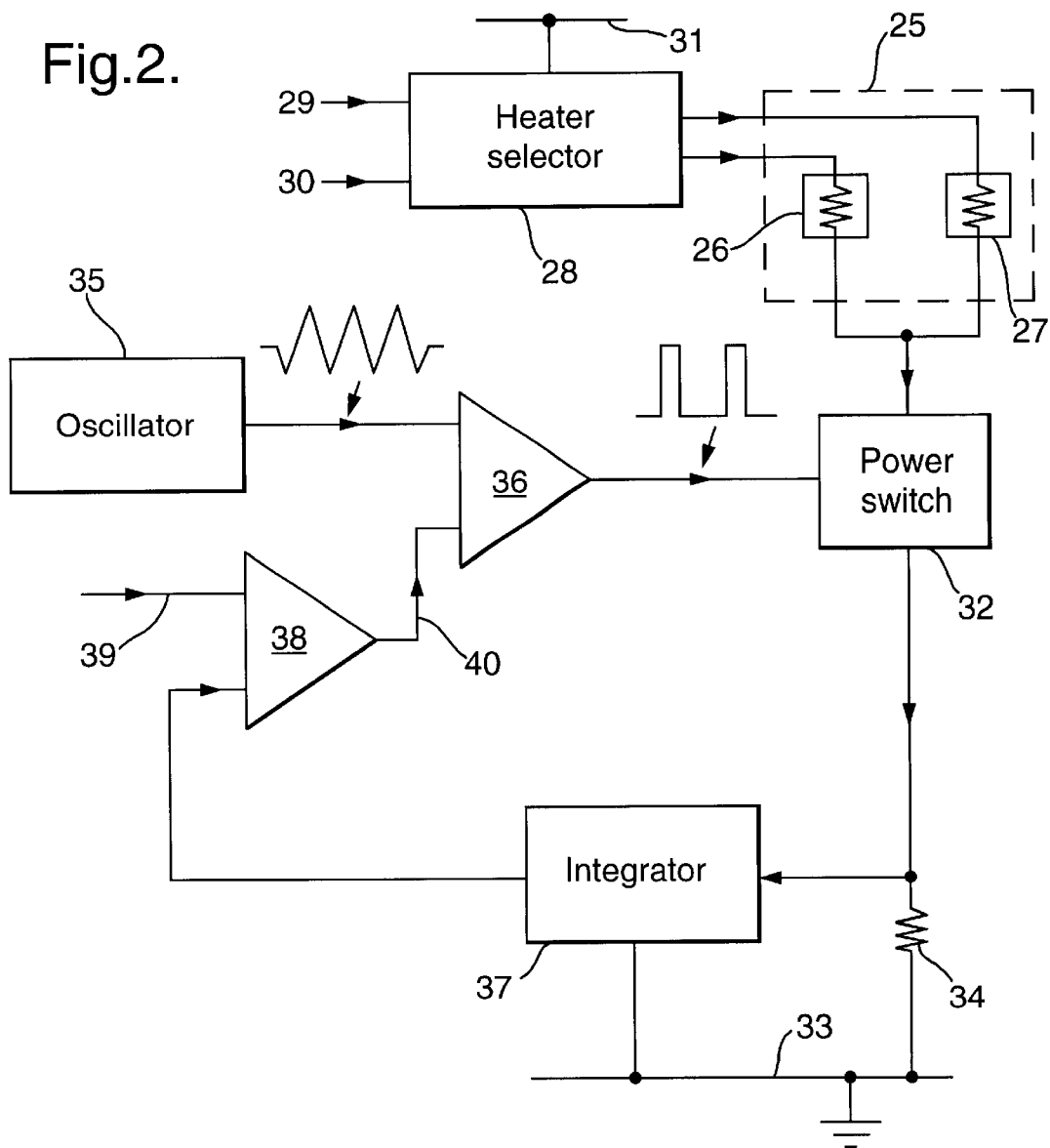
FIG. 2 shows an optical switch arrangement in accordance with the invention which incorporates such an optical switch.

FIG. 2 shows an optical switch arrangement which incorporates an optical switch 25 of the kind shown in FIG. 1, and a drive circuit which supplies precisely constant power to its heaters.

The two groups of heaters 13, 15, 18, 20, and heaters 14, 16, 17, 19 are represented diagrammatically by loads 26 and 27 respectively, the heaters within a given group being connected electrically in parallel. Selection of the appropriate load is by heater selector 28 in dependence on input signals on lines 29, 30. The heater selector 28 connects a precisely maintained voltage rail 31 at a contact predetermined voltage (typically 13 volts) to one or other of the loads 26 or 27. The current paths through the loads are combined at an electrical power switch 32 and returned to the ground voltage rail 33 via a low value sensor resistor 34.

The power switch 32 is an on-off switch with power amplification operating at a repetition rate of 30 kHz, and having a variable mark-space ratio which is adjustable so as to maintain constant power consumption in the loads 26, 27. The repetition rate is determined by a triangular wave oscillator 35, and is chosen in relation to the thermal mass of the loads, so as to be above the frequency at which the temperature of the loads can respond, so as not to impart modulation to light signals passing through the optical switch.

The triangular waveform at 30 kHz is applied to one input of a comparator 36, the other input of which receives a variable threshold level 40. Thus, by altering the threshold level, the mark-space ratio at the output of the comparator is varied.

The current flowing through the sensor resistor 34 is determined by integrating the voltage drop across it by integrator 37. The value of resistor 34 is very low, typically 0.5Ω, whereas the value of each load 26, 27 is typically about 200Ω, so that negligible power is lost in the sensor resistor 34. The output of the integrator 37 is compared at a comparator 38 with a preset reference value 39, and the output of the comparator 38 is proportional to the difference between the inputs, and this varying level output signal constitutes the variable threshold level 40 for comparator 36.

Thus, the circuit is operative to maintain at a constant value the power applied to the loads, despite variations in resistance of the loads due to thermal changes and aging. The power level is selected so as to lie in the center of the tolerance band of typical heaters, so that it is not necessary to individually adjust the characteristics of the circuit to each heater, whilst ensuring precise and reliable operation of the optical switching arrangement over an extended period of time.

What is claimed is:

1. An optical switching arrangement, comprising:
   a) a thermo-optic switch having a plurality of heaters which are selectively energizable to route optical signals;
   b) means for applying a predetermined voltage to the heaters; and
   c) a power circuit for applying a pulsed current having a mark-space ratio to energize the heaters, and for varying the mark-space ratio to achieve a constant, predetermined mean power value for the heaters.

2. The arrangement of claim 1, wherein the power circuit includes a current sensor in electrical series with the plurality of the heaters.

3. The arrangement of claim 2, wherein the heaters are arranged in groups, and wherein the current sensor is common to the groups.

4. The arrangement of claim 2, wherein the power circuit is operative for varying the mark-space ratio as a function of a mean current passing through the current sensor.

5. The arrangement of claim 2, wherein each heater has a resistance, and wherein the current sensor has a resistance less than the resistance of a respective heater.

6. The arrangement of claim 4, wherein the power circuit includes an integrator for integrating the mean current to produce an electrical signal representative of the mean current.

7. The arrangement of claim 1, wherein the power circuit generates the pulsed current with a repetition rate shorter than a temperature rate at which a respective heater is capable of responding to power variations applied to the respective heater.

8. The arrangement of claim 7, wherein the repetition rate is constant.

9. An optical switching arrangement, comprising:
   a) a thermo-optic switch having a plurality of selectively energizable heaters; and
   b) a power control circuit for maintaining constant electrical power for the heaters, including
      i) a selector for selecting selected heaters to route optical signals through the thermo-optic switch in different switching configurations,
      ii) a power switch operatively connected to the heaters in the switching configurations, and
      iii) a current drive circuit for applying a pulsed current having a mark-space ratio to the power switch, and for varying the mark-space ratio to maintain the constant electrical power.

10. The arrangement of claim 9, wherein the selector is operative for selecting a first group of the heaters to route the optical signals in a first of the switching configurations, and a second group of the heaters to route the optical signals in a second of the switching configurations.

11. The arrangement of claim 10, wherein the first and second groups are electrically connected in parallel, and wherein the power switch is connected in electrical series with the parallel groups.

12. The arrangement of claim 11, wherein the drive circuit includes a current sensor in electrical series with the power switch; and a current integrator for integrating a mean current passing through the current sensor to obtain an integrator output signal.

13. The arrangement of claim 12, wherein the drive circuit includes a dual-input threshold comparator having a preset reference value applied to one input of the threshold comparator, and another input to which the integrator output signal is applied to obtain a variable threshold signal at an output of the threshold comparator.

14. The arrangement of claim 13, wherein the drive circuit includes an oscillator for generating an oscillating signal; and a dual-input main comparator having one input to which the oscillating signal is applied, and another input to which the variable threshold signal is applied to obtain the pulsed current.

* * * * *